United States Patent [19]
Beard

[11] Patent Number: 4,797,777
[45] Date of Patent: Jan. 10, 1989

[54] ELECTRONIC SECTIONALIZER AND MOUNTING STRUCTURE FOR SWITCHGEAR

[75] Inventor: Lloyd R. Beard, Centralia, Mo.

[73] Assignee: A. B. Chance Company, Centralia, Mo.

[21] Appl. No.: 110,966

[22] Filed: Oct. 20, 1987

[51] Int. Cl.⁴ .............................................. H02H 7/22
[52] U.S. Cl. .................................... 361/115; 361/102
[58] Field of Search ............... 337/168, 169, 170, 173, 337/171; 361/63, 89, 102, 115, 335

[56] References Cited

U.S. PATENT DOCUMENTS

| | | | |
|---|---|---|---|
| 1,982,986 | 12/1934 | Garlington | 335/26 |
| 2,080,226 | 5/1937 | Paxton | 361/335 |
| 2,792,529 | 5/1957 | Edwards | 361/59 |
| 4,153,924 | 5/1979 | Moran | 361/94 |
| 4,553,188 | 11/1985 | Aubrey et al. | 361/115 |
| 4,636,764 | 1/1987 | Mee et al. | 337/169 |
| 4,670,812 | 6/1987 | Doerfler et al. | 361/83 |

*Primary Examiner*—A. D. Pellinen
*Assistant Examiner*—David A. Osborn
*Attorney, Agent, or Firm*—Hovey, Williams, Timmons & Collins

[57] ABSTRACT

An electronic sectionalizer mechanism includes upper and lower contact mounting structure, and a sectionalizer tube carrying a logic circuit is telescopically received within the lower contact mounting structure. Once fault current conditions downstream of the sectionalizer mechanism are detected by the logic circuit, an actuator is fired and the tube drops in a longitudinal, non-lateral motion toward an isolated or open circuit position. In preferred embodiments of the invention, a pin of the actuator shifts along an axis parallel to the longitudinal axis of the tube so that immediate drop-out of the tube is assured. The sectionalizer mechanism requires comparatively little space for operating clearances and this is especially adapted for use on a retrofit basis within the confines of an existing subsurface or pad-mounted switchgear cabinet; additionally, the sectionalizer mechanism may also be installed in existing overhead mounting structure for cutouts.

13 Claims, 2 Drawing Sheets

ELECTRONIC SECTIONALIZER AND MOUNTING STRUCTURE FOR SWITCHGEAR

BACKGROUND OF THE INVENTION

1. Field of the Invention

The present invention concerns a high voltage sectionalizer mechanism which includes an elongated sectionalizer tube and mounting structure having lower electrical contacts arranged for telescopic reception of the tube. The invention includes an actuator connected to a logic circuit of the sectionalizer and positioned to impart, upon firing, drop-out movement of the tube in an essentially pure longitudinal direction in order to immediately shift an upper portion of the tube away from an upper contact and thereby disconnects the circuit without the use of pivotal mounting structure. The sectionalizer mechanism is especially adapted for retrofit installation within the confines of a cabinet of pad-mounted or subsurface switchgear, and is also useful in overhead installations inasmuch as a relatively small cover can be placed over the mechanism to protect the same from the elements.

2. Description of the Prior Art

In high voltage power distribution systems, automatic reclosers or reclosing circuit breakers are often installed in the main supply line near its source of power. The recloser is operable to de-energize the entire system downstream of the recloser if potentially damaging currents above a certain magnitude are detected. After a short period of de-energization, the recloser re-energizes the system unless excessive current conditions are again sensed.

In recent years, increased attention has been directed toward electronic sectionalizers for disabling branch or lateral lines of a distribution system protected by a reclosing circuit breaker. In brief, electronic sectionalizers disconnects lateral lines after a specified number of opening and closing cycles of the reclosing circuit breaker if over-current conditions are detected in the particular lateral line served by the sectionalizer. The sectionalizer disables the lateral line during a dead portion of one of the opening and closing cycles of the reclosing circuit breaker and the lateral line remains in a deactivated state until the problem is corrected and the sectionalizer is re-set. In this manner, current may be automatically and immediately restored to the remaining lateral lines during a subsequent closing cycle of the reclosing circuit breaker.

Certain electronic sectionalizers known in the art are physically interchangable with conventional, overhead cutouts so that sectionalizer can be installed on a retrofit basis in existing cutout mounting structure. These types of sectionalizers include an elongated, electrically conductive tube engageable with upper and lower contacts of the cutout mounting structure, and a logic circuit carried by the tube is arranged to sense the flow of current along the tube and fire an actuator for swinging drop-out of the tube away from the upper contact of the mounting structure and toward an isolated or open circuit position.

Sectionalizers such as those described in U.S. Pat. Nos. 4,553,188 and 4,636,764 are provided with a pivot mechanism that causes the upper portion of the sectionalizer tube to swing away from the upper contact about a horizontal axis once the actuator is fired. The sectionalizer mechanism illustrated in U.S. Pat. No. 4,553,188 has an actuator that, when fired, engages a latch which then shifts toward a release position and allows the tube to swing toward a drop-out orientation under the influence of a spring and/or the forces of gravity. The pivot mechanism of the sectionalizer shown in U.S. Pat. No. 4,636,764 is in the nature of an over-center toggle arrangement, and an actuator is located to move the sectionalizer tube overcenter when fired whereupon the upper portion of the sectionalizer tube pivots and falls away from the upper contact toward an isolated position.

In a pending U.S. Pat. application filed Sept. 11, 1987, and entitled "Latch and Pivot Mechanism for Electronic Sectionalizer Mounting Structure", Ser. No. 07/095,548, and assigned to the assignee of the present invention, an actuator is positioned such that all of the force exerted by the actuator is directed toward a pivotal member interconnecting the tube and the lower contact, and the tube immediately begins a downward, pivotal drop-out motion simultaneously with firing of the actuator. Substantially all of the force exerted by the actuator is directed toward the pivotal member and causes immediate lateral movement of the sectionalizer tube in order to reliably ensure successful drop-out of the tube regardless of adverse environmental conditions and with minimal reliance upon springs or the effects of gravity.

While certain of the aforementioned electronic sectionalizers and pivot mechanisms may be installed on a retrofit basis in existing outdoor, overhead cutout mounting structure, such devices are not a suitable replacement for fuses within many types of pad-mounted or subsurface switchgear. More specifically, there is often not sufficient clearance within the confines of the metal cabinet of pad-mounted and subsurface switchgear to allow the sectionalizer to move laterally and swing in an arc during its drop-out motion when fault currents are detected. As a consequence, a need exists for an electronic sectionalizer which requires smaller operating clearances than the clearances necessary for satisfactory operation of devices that are currently known.

SUMMARY OF THE INVENTION

The present invention solves the foregoing problems by provision of an electronic sectionalizer having a tube which shifts solely in a longitudinal or vertical direction during its drop-out movement in order to avoid electrical or mechanical contact with other components within a switchgear cabinet. Only a relatively small space beneath the lower contact of the mounting structure is necessary to ensure sufficient clearance for drop-out of the tube and thus the invention may be readily installed within many types of existing metal enclosed switchgear.

In more detail, the sectionalizer mechanism of the present invention includes a spool-shaped collar constructed to fit within a U-shaped clip of the lower mounting structure. A plurality of contact fingers located within a vertical, cylindrical bore of the collar are arranged to engage a lower sleeve of a sectionalizer tube when the latter is in its loaded, closed circuit position. Once a logic circuit of the sectionalizer determines that the lateral line should be disabled, an actuator is fired and the tube slides through the bore in the collar in a longitudinal direction to thereby simultaneously shift an upper end of the tube away from a contact of upper mounting structure and toward an isolated, open circuit position.

In preferred forms of the invention, the actuator is mounted on a circular flange of a ferrule or sleeve which comprises a lower end portion of the sectionalizer tube. The actuator is positioned such that upon firing of the actuator, a pin moves upwardly in a direction parallel to the longitudinal axis of the sectionalizer tube and strikes a lower end surface of the collar. As a result, substantially all of the force exerted by the actuator is utilized to shift the flange and thereby the sectionalizer tube in a vertical, downward direction so that immediate, reliable drop-out of the sectionalizer tube is assured.

The sectionalizer mechanism of the present invention may also be installed in overhead cutout mounting structure with equally advantageous results. In this regard, the relatively small operating clearances needed for the sectionalizer allows a compact cover or shield to be placed over the sectionalizer and the mounting structure so that environmental factors such as ice and foreign objects do not interfere with mechanical movement of the sectionalizer tube during its drop-out motion.

DETAILED DESCRIPTION OF THE DRAWINGS

Figure 1:
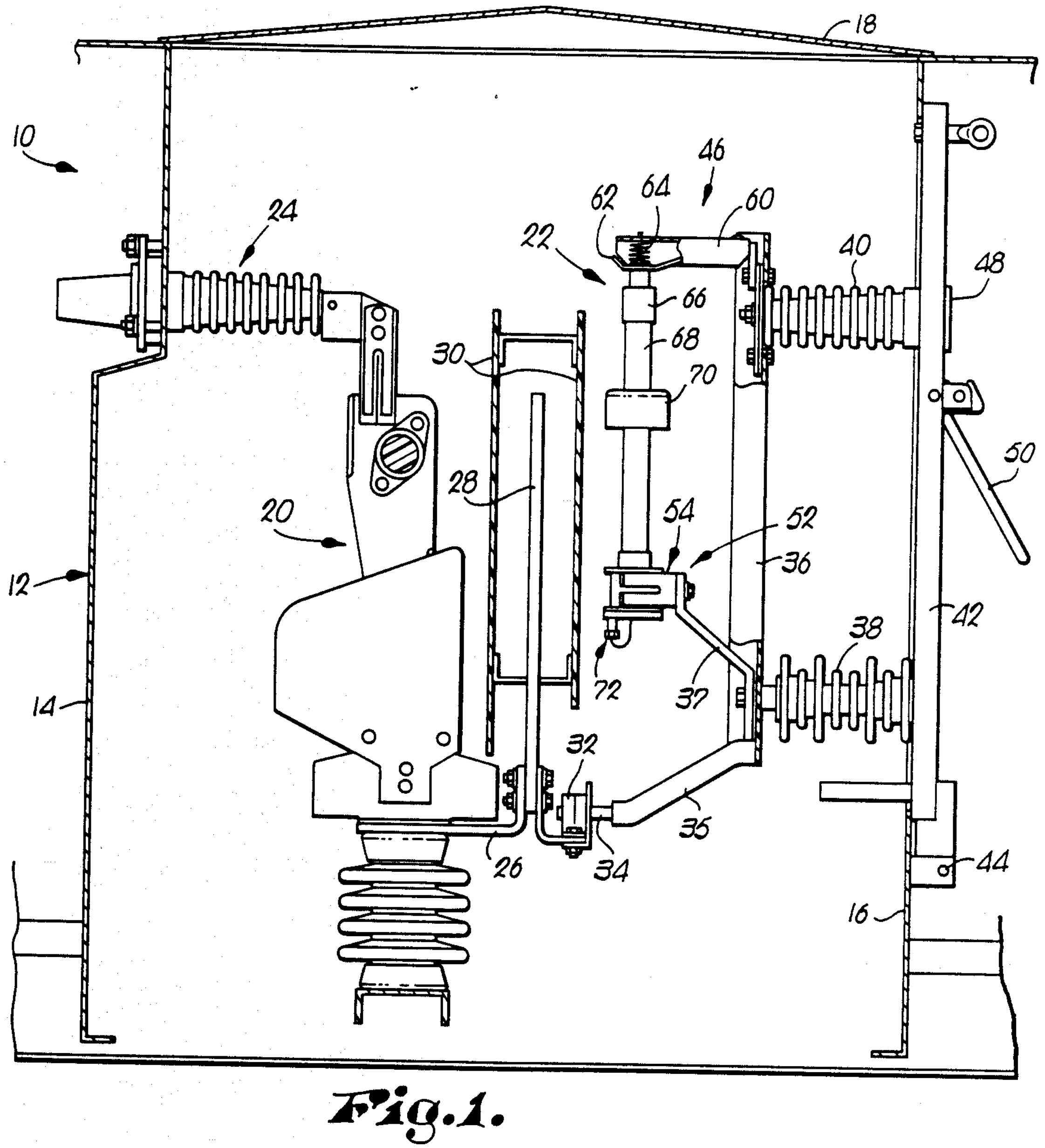
FIG. 1 is a fragmentary, side crosssectional view of a switchgear cabinet wherein a sectionalizer mechanism constructed in accordance with the invention is installed on upper and lower fuse mounting structure.
Figure 7:
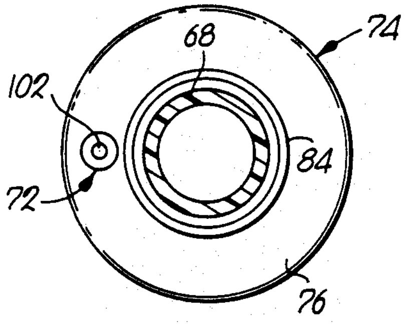
FIG. 7 is a horizontal sectional view taken along line 7—7 of FIG. 5, showing the circular configuration of a flange of the sleeve and the location of the actuator thereon.
Figure 2:
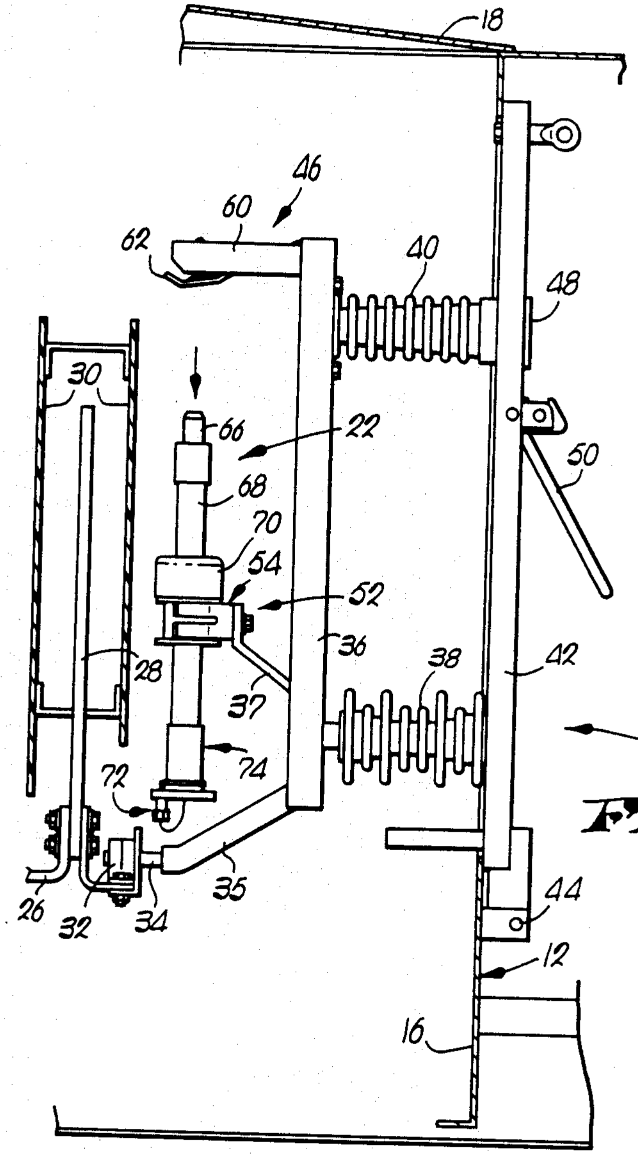
FIG. 2 is a view somewhat similar to FIG. 1 except that a tube of the sectionalizer mechanism has shifted from its latched or loaded position and toward an unlatched, isolated position.

Referring initially to FIGS. 1 and 2, the switchgear apparatus 10 includes a pad-mounted metallic cabinet 12 having upright, spaced apart interior sidewalls 14, 16 and a pitched cover 18. The switchgear apparatus 10 is a three-phase device, and accordingly is provided with laterally spaced apart switch mechanisms 20 as well as corresponding sectionalizer mechanisms 22 each of which will be described in more detail below.

The switch mechanism 20 (FIG. 1) is electrically connected to a bushing assembly 24 which extends through sidewall 14 for connection with a source or main power line. The switchgear mechanism 20 may take the form of improved blade-type air dielectric switchgear such as that which is described in pending U.S. Patent application Ser. No. 106,379 entitled "Replaceable Bushing and Contact Assembly for Blade-Type Air Insulated Switchgear" in the names of Gerald Roberts et al., and assigned to the assignee of the present invention; this application is expressly incorporated by reference herein.

One terminal of the switchgear mechanism 20 is electrically connected to a bracket 26 that is, in turn, secured to a U-shaped bus bar 28 electrically interconnected with other associated phase switch mechanisms within cabinet 12. An upper portion of bus bar 28 is partially enclosed within a pair of electrically insulative walls 30.

Bus bar 28 is connected to another bracket that supports spring-type contact fingers 32. The contact fingers 32 slidably engage opposite sides of a contact member 34 which is electrically coupled to a lead 35 mounted on a rigid, electrically insulative beam 36 optionally constructed of glass fiber reinforced materials. The beam 36 is secured by a lower insulator 38 and an upper insulator 40 to an interior door 42 that is pivotal about a horizontal axis designated 44.

A lead extends through the upper insulator 40 to electrically couple upper contact mounting structure 46 to a load side bushing assembly 48 which extends through door 42. An external operating bail 50 may be shifted to unlatch door 42 and enable the latter to swing about axis 44 while simultaneously disengaging contact member 34 from contact fingers 32 as may be desirable for gaining access to interior regions of cabinet 12 for servicing and the like. Although not shown, a conductive elbow of one phase of a lateral line is complementally received in bushing 48 during normal operating conditions although the elbow must be removed from bushing 48 and parked to one side of the door 42 before clearance is available for shifting of the bail 50 to unlatch door 42.

Turning now in more detail to the structure of the present invention, sectionalizer mechanism 22 includes second or lower contact mounting structure 52 vertically spaced from the first or upper contact mounting structure 46. The lower mounting structure 52 includes a resilient, spring-type clip 54 that is generally U-shaped in horizontal view as can be appreciated by a reference to FIG. 6. The clip 54 includes two pairs of inwardly biased, side arms 56 (FIGS. 1, 2, and 6) as well as a bight portion 58 integral with arms 56 and bolted to an upper end section of a lead 37 connected to lead 35.

Referring again to FIGS. 1 and 2, the upper contact mounting structure 46 includes an outer, horizontally extending body 60 that is rigidly secured to beam 36. A first contact or contact lever 62 electrically and mechanically connected to body 60 is shiftable within a recess of the latter, and is biased in a downwardly direction by a compression spring 64. A lower, horizontal region of contact lever 62 formed to present a somewhat semispherical recess that is engagable with an upper, frustoconical portion of a metallic ferrule 66 that comprises a first or upper end portion of a hollow, cylindrical sectionalizer element or tube 68 as is shown best in FIG. 2.

The sectionalizer mechanism 22 also includes a logic circuit 70 that is encapsulated within a synthetic resinous material which presents an overall annular configuration and which is secured to an outer wall of sectionalizer tube 68. The logic circuit 70 detects the magnitude of current flowing through tube 68, and if a reclosing circuit breaker upstream of switchgear apparatus 10 initiates one or more opening and closing cycles in response to current magnitudes in the main line above a certain, pre-selected value, the sectionalizer counts the number of opening and closing cycles and fires an actuator 72 (see FIGS. 3–5) during a subsequent dead portion of the opening and closing cycle if the logic circuit 70 determines that over-current conditions exist downstream of sectionalizer mechanism 22. A further understanding of the operation of logic circuit 70 may be obtained by a study of a somewhat similar logic circuit described and illustrated in U. S. Pat. No. 4,553,188, the disclosure of which is hereby incorporated into the present document.

Figure 3:
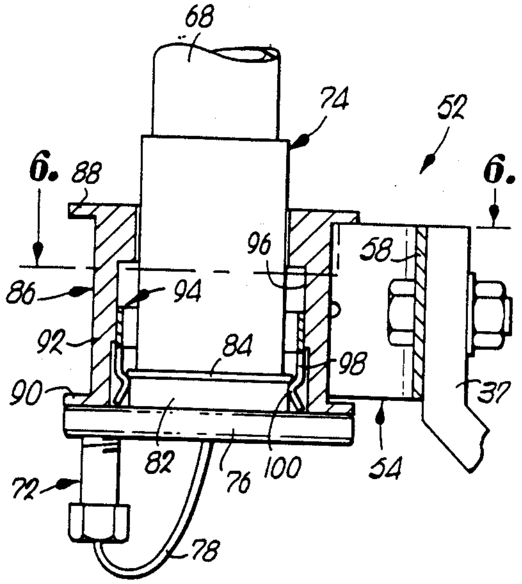
FIG. 3 is an enlarged, fragmentary, side cross-sectional view of the sectionalizer mechanism illustrated in FIG. 1 showing, among other things, a collar received in a clip of lower mounting structure and a sleeve comprising lower end portion of the sectionalizer tube located within a vertical, central bore of the collar.
Figure 5:
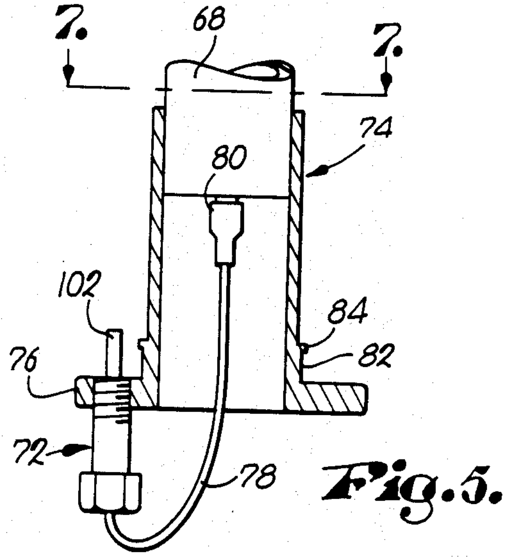
FIG. 5 is a fragmentary, side cross-sectional view of the sectionalizer tube and sleeve depicted in FIGS. 3 and 4.
Figure 4:
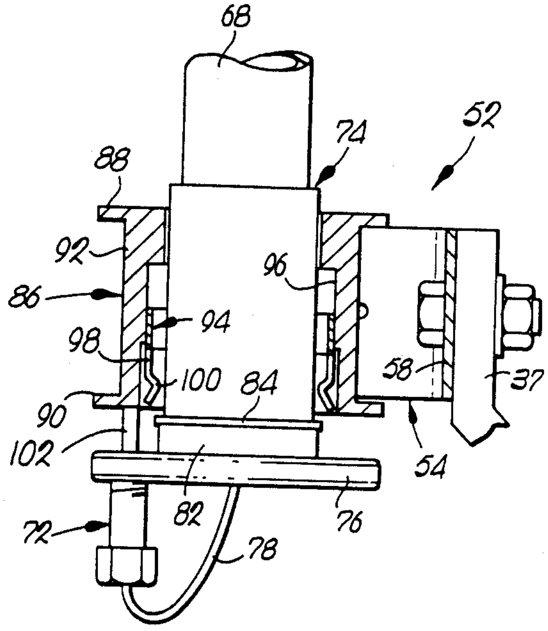
FIG. 4 is a view somewhat similar to FIG. 3 except that an actuator connected to a logic circuit of a sectionalizer has fired to initiate downward movement of the sleeve and tube relative to the collar.

Viewing FIGS. 3–5, a metallic ferrule or sleeve 74 comprising a second or lower end portion of sectionalizer tube 68 presents a lowermost, circular, outwardly extending flange 76 that is tapped to threadably receive actuator 72 in an orientation parallel to the central, longitudinal axis of sectionalizer tube 68. The actuator 72 is electrically connected by a lead 78 to a releasable spade-type terminal connection 80 mounted at the lower end of tube 68 and within the hollow interior of sleeve 74. In turn, the terminal connection 80 is in electrical communication with logic circuit 70.

The sleeve 74 also includes a cylindrical, peripheral section 82 disposed above flange 76 and below a circular, outwardly extending rib 84. As can be seen by reference to FIGS. 3–5, the peripheral section 82 is somewhat smaller in diameter than the outer diameter of rib 84, but is somewhat larger in diameter than the remaining cylindrical extent of sleeve 74 above rib 84. The sleeve 74, in similar fashion to upper ferrule 66, is rigidly affixed to sectionalizer tube 68 for secure mechanical and electrical interconnection with the same.

Viewing FIGS. 1–4, sectionalizer mechanism 22 further includes a metallic, spool-shaped collar 86 having upper and lower circular flanges or lips 88, 90 respectively (FIGS. 3 and 4) which bound a cylindrical middle portion 92 of collar 86. The middle portion 92 is of a diameter for snap fit within the confines of the spring-like arms 56 of clip 54 for releasable electrical and mechanical engagement with the same. As shown best in FIG. 6, sections of the clip arms 56 are formed with a radius of curvature complemental to the radius of curvature of middle portion 92 to ensure secure interconnection with collar 86. Although not illustrated in the drawings, a bail-shaped member normally extending in a horizontal direction around collar 86 may optionally be provided to close the gap between the ends of arms 56 to prevent unintentional disengagement of collar 86 from arms 56; such a member may be swingable about a horizontal axis to an out-of-the-way position to allow removal of collar 86 from clip 54 when desired.

Figure 6:
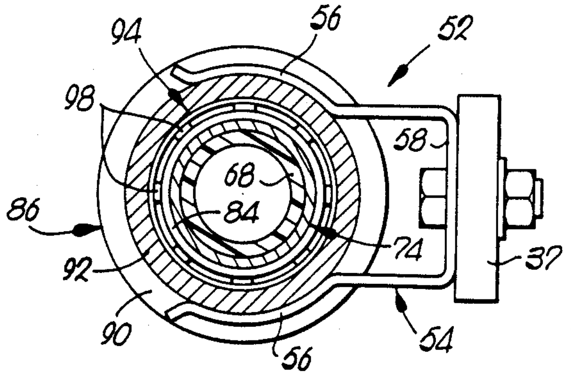
FIG. 6 is a horizontal sectional view taken essentially along line 6—6 of FIG. 3, illustrating the configuration of the U-shaped clip of the lower mounting structure and the radially spaced arrangement of eight contact fingers mounted on the collar for symmetrical engagement with a peripheral section of the sleeve.

A lower contact 94 (see FIGS. 3 and 4) includes an annular portion that is fixed to an inner wall of collar 86 within a central, vertically extending, generally cylindrical bore 96 of the latter. Eight contact fingers 98 integrally depend from the annular portion of contact 94, and are equally spaced in radial fashion around the circumference of bore 96 as shown in FIGS. 3 and 6.

Each of the contact fingers 98 includes an inwardly extending, arched portion or shoulder 100. As illustrated in FIG. 3, the shoulders 100 are constructed to fit beneath rib 84 and engage peripheral section 82 of sleeve 74 when the sectionalizer tube 68 is in a latched or loaded position which is also shown in FIG. 1. Each of the contact fingers 98 is sufficiently biased inwardly to retain shoulder 100 in contact with the underside of rib 84 for normally preventing downward movement of tube 68 which might otherwise occur due to the downward bias presented by compression spring 64 of the upper contact mounting structure 46.

Thus, during normal operation of apparatus 10, current flowing through sectionalizer mechanism 22 follows a path along lead 37, clip 54, collar 86 and contact 94 including all of the contact fingers 98, and then through sleeve 74, along tube 68 and ferrule 66 to contact lever 62 of upper contact mounting structure 46 and to the bushing 48. A satisfactory high current interconnection between collar 86 and sectionalizer tube sleeve 74 is provided by the arrangement of the eight inwardly biased contact fingers 98 which are equally spaced around the circumference of peripheral section 82 of sleeve 74.

Once the logic circuit 70 has determined that over-circuit conditions exist downstream of sectionalizer mechanism 22, logic circuit 70 activates actuator 72 for immediate firing or ejection of an actuator pin 102 (FIGS. 4 and 5) in an upwardly direction that is parallel to the longitudinal axis of tube 68. The actuator pin 102 strikes a lower wall of collar 86 below lip 90 with sufficient force to urge tube 68 in a downwardly direction and simultaneously cause rib 84 of sleeve 74 to immediately deflect all eight of the contact fingers 98 in a radially outwardly direction. As shown in FIGS. 3 and 4, the bore 96 of collar 86 is undercut slightly to present a recess below the annular portion of contact 94 to afford sufficient clearance for outward deflection of the contact fingers 98 as the rib 84 passes over the arched shoulders 100 of the same.

By observation of FIG. 4, however, it can be observed that full extension of pin 102 does not occur until the rib 84 has shifted vertically a distance past the shoulders 100. As such, a substantial portion of the force presented by pin 102 upon firing of the actuator 72 is available for acceleration of the tube 68 in a downward direction subsequent to the time that the fingers 98 have disengaged sleeve 74. Thus, the tube 68 immediately attains a velocity of a relatively high magnitude upon firing of the actuator 72, which motion is complemented by the downwardly directed bias presented by compression spring 64 upon the upper ferrule 66 as well as on the effects of gravity.

By the time that the actuator pin 102 is fully extended, the relatively high velocity of selectionalizer tube 68 causes the upper ferrule 66 to quickly thereafter disengage the contact lever 62 and electrically isolate the upper contact mounting structure 46 from the lower contact mounting structure 52 to thereby disable the lateral line downstream of bushing 48. However, tube 68 continues to move in a downwardly direction until the encapsulated~ logic circuit 70 contacts an upper, flat horizontal surface of collar 86. As such, the encapsulated covering of the logic circuit 70 provides a stop to prevent further downward movement of tube 68.

It can now be appreciated that the purely longitudinal or vertical movement of the tube 68 when shifting from a loaded, latched or closed circuit position and toward an isolated, unlatched open circuit position is advantageous in that only a relatively small clearance space is needed below the lower contact mounting structure 52. In this regard, the internal walls 30 of the apparatus 10 as shown in FIGS. 1 and 2 would mechanically interfere with drop-out of many of the known, pivotally mounted electronic sectionalizers.

Furthermore, it is noteworthy that the purely longitudinal movement of tube 68, facilitated by alignment of actuator 72 with the longitudinal axis of tube 68, allows the upper ferrule 66 to disengage the contact lever 62 after only a relatively short period of time in order to quickly disable the downstream lateral line. By comparison, pivotally mounted electronic sectionalizers shift during drop-out both in a lateral direction as well as a longitudinal direction, and therefore a somewhat longer period of time is observed before the lateral line is disabled, other factors being equal.

We claim:

1. Electronic sectionalizer mechanism comprising:

an elongated element having an upper portion and a lower portion electrically connected to said upper portion;

means for sensing the magnitude of current through said element;

upper mounting structure including an upper contact engageable with said upper portion of said element;

lower mounting structure including a lower contact and means releasably retaining said element in an upright operating position with said upper portion and said lower portion of said element in engagement with said upper contact and said lower contact respectively; and means connected to said sensing means for enabling release of said element from said perating position and for causing essentially longitudinal, non-lateral, downward movement of said element away from said operating position in order to shift said upper portion away from said upper contact and toward an isolated, open circuit position.

2. The invention as set forth in claim 1, wherein said means connected to said sensing means includes an actuator having a pin shiftable in a direction substantially parallel to the longitudinal axis of said element.

3. The invention as set forth in claim 2, wherein said actuator is carried by said element adjacent said lower portion of said element and is positioned to enable said pin to engage said lower mounting structure.

4. The invention as set forth in claim 1, wherein said upper mounting structure includes means biasing said element in a downwardly, substantially longitudinal direction.

5. The invention as set forth in claim 1; and including stop means connected to said element and engagable with said lower mounting structure subsequent to release of said element from said operating position.

6. The invention as set forth in claim 1, wherein said lower contact comprises a plurality of contact fingers arranged in spaced relationship around the periphery of said lower portion of said element when said element is in said operating position.

7. The invention as set forth in claim 6, wherein said lower portion of said element is slidably engagable with contact fingers as said element is released from said operating position.

8. Electronic sectionalizer mechanism including:

an elongated element having a first portion and a second portion electrically connected to said first portion;

means for sensing the magnitude of current flowing through said element;

first mounting structure including a first contact engageable with said first portion of said element;

second mounting structure constructed for telescopically receiving said second portion of said element and including a second contact engageable with said second portion of said element;

means for releasably retaining said element in an operating position with said first portion and said second portion of said element in engagement with said first contact and said second contact respectively; and means coupled to said sensing means for selectively releasing said element from said operating position and for enabling telescopic movement of said element in an essentially longitudinal direction through said second mounting structure in order to shift said first portion of said element away from said first contact and toward an isolated, open circuit position.

9. The invention as set forth in claim 8, wherein said longitudinal axis of said element is oriented in an upright disposition.

10. The invention as set forth in claim 9, wherein said means for releasing said element from said operating position includes an actuator having a pin shiftable in a direction substantially parallel to the longitudinal axis of said element.

11. The invention as set forth in claim 8, wherein said second mounting structure includes an annular collar, and wherein said second contact includes a plurality of contact fingers arranged in spaced, radial relation within the bore of said collar.

12. The invention as set forth in claim 11, wherein said second portion of said element includes a peripheral rib releasably engagable with said contact fingers.

13. The invention as set forth in claim 8; and including a switchgear cabinet substantially enclosing said sectionalizer mechanism.

* * * * *